United States Patent
Adhikari

(10) Patent No.: US 7,233,991 B2
(45) Date of Patent: Jun. 19, 2007

(54) SELF-HEALING TREE NETWORK

(75) Inventor: Prasanna Adhikari, Pasadena, CA (US)

(73) Assignee: Clearmesh Networks, Inc., Pasadena, CA (US)

( * ) Notice: Subject to any disclaimer, the term of this patent is extended or adjusted under 35 U.S.C. 154(b) by 501 days.

(21) Appl. No.: 10/647,070

(22) Filed: Aug. 22, 2003

(65) Prior Publication Data

US 2005/0044211 A1  Feb. 24, 2005

(51) Int. Cl.
*G06F 15/173* (2006.01)

(52) U.S. Cl. ............... 709/224; 709/221; 709/227; 709/242; 714/4; 370/256

(58) Field of Classification Search ........... 709/220, 709/221, 223, 224, 238, 239, 242, 227; 714/2–4; 370/254, 256, 408
See application file for complete search history.

(56) References Cited

U.S. PATENT DOCUMENTS

| | | | |
|---|---|---|---|
| 5,887,127 A * | 3/1999 | Saito et al. .................... 714/4 |
| 5,941,955 A * | 8/1999 | Wilby et al. ................ 709/242 |
| 6,032,194 A * | 2/2000 | Gai et al. .................... 709/239 |
| 6,047,331 A * | 4/2000 | Medard et al. ............. 709/239 |
| 6,141,344 A * | 10/2000 | DeLong ....................... 370/360 |
| 6,363,068 B1 * | 3/2002 | Kinoshita ................... 370/389 |
| 6,535,491 B2 * | 3/2003 | Gai et al. .................... 370/256 |
| 6,636,983 B1 | 10/2003 | Levi |
| 6,691,209 B1 | 2/2004 | O'Connell |
| 6,728,205 B1 * | 4/2004 | Finn et al. ................... 370/217 |
| 6,889,254 B1 * | 5/2005 | Chandra et al. ............ 709/224 |
| 6,934,299 B2 * | 8/2005 | Kaatz ......................... 370/459 |
| 6,993,033 B1 * | 1/2006 | Williams .................... 370/400 |
| 7,002,955 B1 * | 2/2006 | Kanuri et al. .............. 370/389 |
| 2001/0021177 A1 * | 9/2001 | Ishii ........................... 370/256 |
| 2001/0025318 A1 * | 9/2001 | Higashiyama .............. 709/238 |
| 2002/0029287 A1 * | 3/2002 | Yemini et al. ............. 709/238 |
| 2002/0147800 A1 * | 10/2002 | Gai et al. .................... 709/221 |
| 2002/0167898 A1 * | 11/2002 | Thang et al. ............... 370/216 |
| 2003/0051051 A1 * | 3/2003 | O'Neal et al. ............. 709/242 |
| 2003/0095504 A1 * | 5/2003 | Ogier ......................... 370/235 |
| 2003/0235158 A1 * | 12/2003 | Lee et al. ................... 370/256 |
| 2004/0017770 A1 * | 1/2004 | Higashiyama et al. ...... 370/223 |
| 2004/0103282 A1 * | 5/2004 | Meier et al. ................ 713/171 |

OTHER PUBLICATIONS

Fujii, H. et al., "Restoration message transfer mechanism and restoration characteristics of double-search self-healing ATM network", Selected Areas in Communications, IEEE Journal, vol. 12, Issue 1, Jan. 1994 pp. 149-158 ☐☐.*

(Continued)

*Primary Examiner*—Oanh Duong
(74) *Attorney, Agent, or Firm*—Christie, Parker & Hale, LLP

(57) ABSTRACT

A communications network is provided with a self-healing topological architecture. Each node in the network detects continuously transmitted beacon packets that are propagated through the network at regular intervals by a root node. Upon failure to detect a new beacon packet after a predetermined time from a parent node, a network node determines a network isolation condition and searches for another node that is still actively connected in the network. Algorithms are provided for registering with and identifying active parent node candidates during a network failure so as to prevent the creation of network loops.

15 Claims, 4 Drawing Sheets

OTHER PUBLICATIONS

Wu, T. et al., "A service restoration time study for distributed control SONET digital cross-connect system self-healing networks", IEEE International Conference, vol. 2, May 23-26, 1993 pp. 893-899.☐☐.*

Hasegawa, S. et al., "Integrated Self-healing Network For STS-1/STS-3C Path Level Restoration", Network Operations and Management Symposium, IEEE, vol. 2, 1992 pp. 219-230.☐☐☐☐.*

* cited by examiner

SELF-HEALING TREE NETWORK

FIELD OF THE INVENTION

This invention generally relates to data communication, and in particular it relates to network signaling.

BACKGROUND OF THE INVENTION

A communications network, such as a computer network, a telecommunications network, an optical network, a wireless network, or any other network type, typically includes a number of nodes that allow routing, signaling and communication of data between electronic, telephonic or computing devices. Many such communications networks are known to include Layer 2 (Ethernet) or Layer 3 (Internet Protocol or IP) switches to readily accomplish these functions. The Layer 2 protocol is also referred to as a Data Link layer. The main task of this Data Link layer is to configure a raw transmission line such that it remains free of transmission errors.

Referring now to FIGS. 1–3, in an Ethernet-based local-area network (LAN), network nodes or switches 102 are interconnected by a plurality of network segments 100. The key function of such a node 102, which includes an Ethernet switch, is to forward a data packet it receives on one of its ports to any one or more of the other ports. As a packet is received, a node 102 examines its destination address to decide which segment the packet is to be forwarded on. In a typical scenario, a node 102 or a switch makes a forwarding decision and forwards a packet to appropriate network destination as soon as the entire packet is received. Once such a decision has been made, the node 102 transmits the data packet over the corresponding network segment 100. If the node 102 can determine which segment a packet is to be forwarded, it forwards the packet to only that segment. If the node 102 has no knowledge of where a packet is to be forwarded or if the packet is to be forwarded to everyone (such as in the case of a broadcast packet), it forwards the packet to all the network segments 100 with which it is connected, with the exception of the segment from which the packet was received.

One characteristic of a network segment 100 is that all the connected network nodes 102 share a common physical medium for the transmission and reception of data packets. Such data packets typically include a source address and destination address, commonly referred to as media access control (MAC) addresses, which allow nodes to identify proper switching of the data packet within the network.

By sharing the same physical medium, all the nodes 102 in a segment 100 can receive data packets transmitted by any other node 102 connected to that segment 100. However, it also allows the nodes 102 within the same network segment 100 to interfere with each other when two or more nodes 102 transmit a data packet at the same time. Such collisions can significantly reduce the throughput of the network once the number of nodes 102 in each segment 100 grows.

As the number of nodes 102 in a network grows, a corresponding reduction in network capacity or bandwidth due to collisions is alleviated by separating various segments into two or more separate segments 100 and using bridging devices to bridge data traffic between them. Such bridging devices, which may likewise include an Ethernet switch, have two or more interfaces, each connected to a different network segment 100. The bridging devices function in such a way that the aggregate of all the connected segments 100 behave like a single LAN. Packets generated within one segment 100 and destined for a node 102 within the same segment 100 are typically not transmitted into another segment 100, thus reducing network collisions.

One such function that a switch is required to perform is the propagation of a broadcast data packet that is generated in one segment 100 and is meant to be transmitted to all other segments 100 with which the switch is connected. The switches must also be able to forward other types of data packets with unknown destinations. For example, when a switch receives a data packet and it does not know the segment 100 in which the destination address for the packet resides, it forwards the packet to all the segments 100 except the segment from which the packet was received.

Because of the characteristics of segments 100 and nodes 102 outlined above, network segments 100 should, in general, not be interconnected by nodes 102 in such a way that a network loop is created. The problems created by network loops can be illustrated by the simple case of three switches 102 that are used to connect three network segments 100, as shown in FIG. 1. When such a loop is created, any broadcast packet generated within one network segment 100 is forwarded by the switches 102 through the network and the packet continues to propagate around the network until the network loop is broken. The situation is even more pronounced in the case of a mesh network, as shown in FIG. 2, where a broadcast packet not only gets propagated but also gets multiplied as it propagates around the network. This eventually leads to the network as a whole to be saturated with broadcast packets, a situation often referred to as "broadcast storm," such that network bandwidth is adversely affected.

Accordingly, in order to avoid these problems, a Layer 2 mesh network must not have any loops in at least its logical connections. One optimal way to interconnect network nodes 102 without creating a network loop is to deploy them in a tree topology, as illustrated in FIG. 3. Such a topology may optimize the average distance between segments in a network. As will be readily appreciated, a mesh network can be converted into a tree network by eliminating certain logical or physical network segments 100.

A tree network, however, suffers from certain limitations. In particular, if any network segment 100 or switch fails, all the network segments 100, nodes 102 and switches that are downstream from the failure become isolated and are no longer able to transmit or receive data packets via the network. In such a case, the network gets separated into two or more sub-networks that are isolated from each other. The nodes 102 in one such sub-network would not be able to receive traffic from the nodes 102 in any other sub-networks. Such isolation remains in effect until either the network recovers from the failure or the network topology is changed.

As one solution to the deficiencies of tree networks, the IEEE has introduced a spanning tree protocol (STP) that allows a self-recovery capability by a network node in response to a network failure. However, upon isolation detection, network recovery in such a system is a slow process, typically requiring several minutes.

Accordingly, there is a need for a network isolation detection and recovery protocol that addresses certain problems of existing network technologies.

SUMMARY OF THE INVENTION

It is an object of the present disclosure, therefore, to have a system directed to particular features of a self-healing tree network. In particular, one aspect of the invention includes a method and apparatus for detecting a network failure at a network node, in which a beacon packet is received from a parent node over a network. An aging indicator for the beacon packet is stored after an aging interval and a network isolation condition is determined if the aging indicator is not reset by a second beacon packet received before a second interval greater than the aging interval.

The beacon packets may originate from root node that generates beacon packets having a unique source and destination address, as well as other unique identifiers. In certain embodiments, the beacon packets contain no payload information other than these identifiers. The beacon packets are continuously transmitted to downstream nodes at an interval that is less than an aging interval used by the downstream node to age the beacon packet.

Upon determining a network isolation condition based on an age of a stored beacon packet received from a parent node, a node may search for a new source of beacon packets from a neighboring node other than the parent node. If such a neighboring node is found, the isolated node transmits a registration request to the neighboring node to establish the neighboring node as a new parent node.

Upon receipt of a reconfiguration request from a management system, the node may first transmit a discovery message on a parent port to determine if the neighboring node is a descendant and when the neighboring node is not a descendant, a registration request is sent to the neighboring node. In this manner, creation of network loops may be avoided.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION OF THE SPECIFIC EMBODIMENTS

Figure 1:
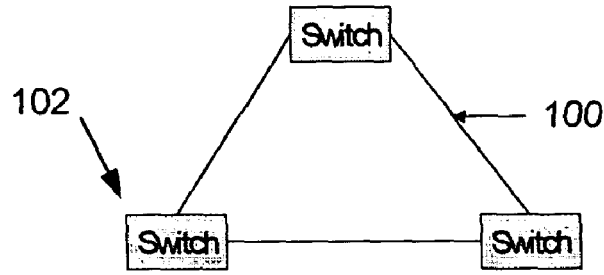
FIG. 1 is a diagram of a simple network loop of the prior art.
Figure 2:
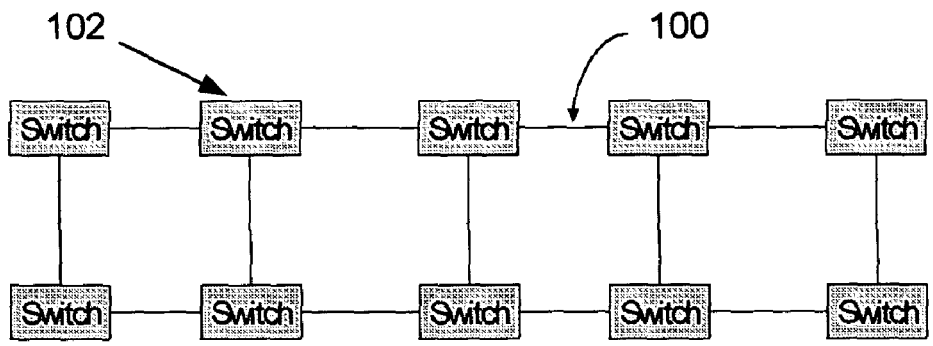
FIG. 2 is a diagram of an exemplary mesh network of the prior art.
Figure 3:
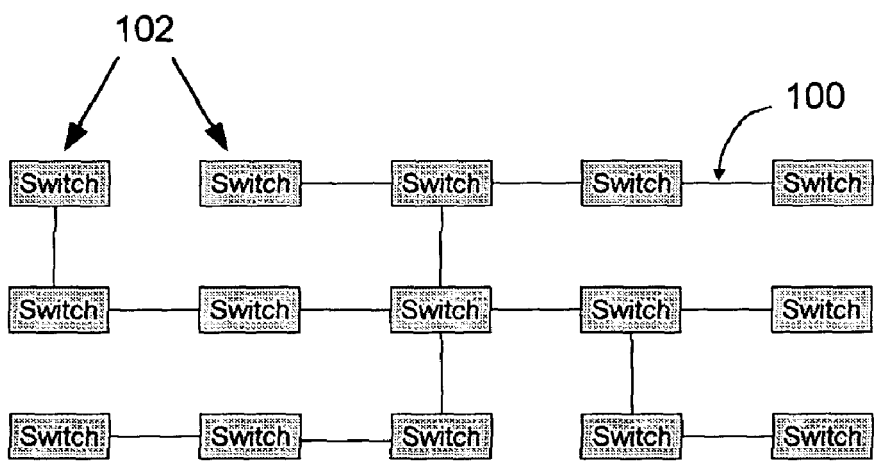
FIG. 3 is a diagram of an exemplary tree network of the prior art.
Figure 4:
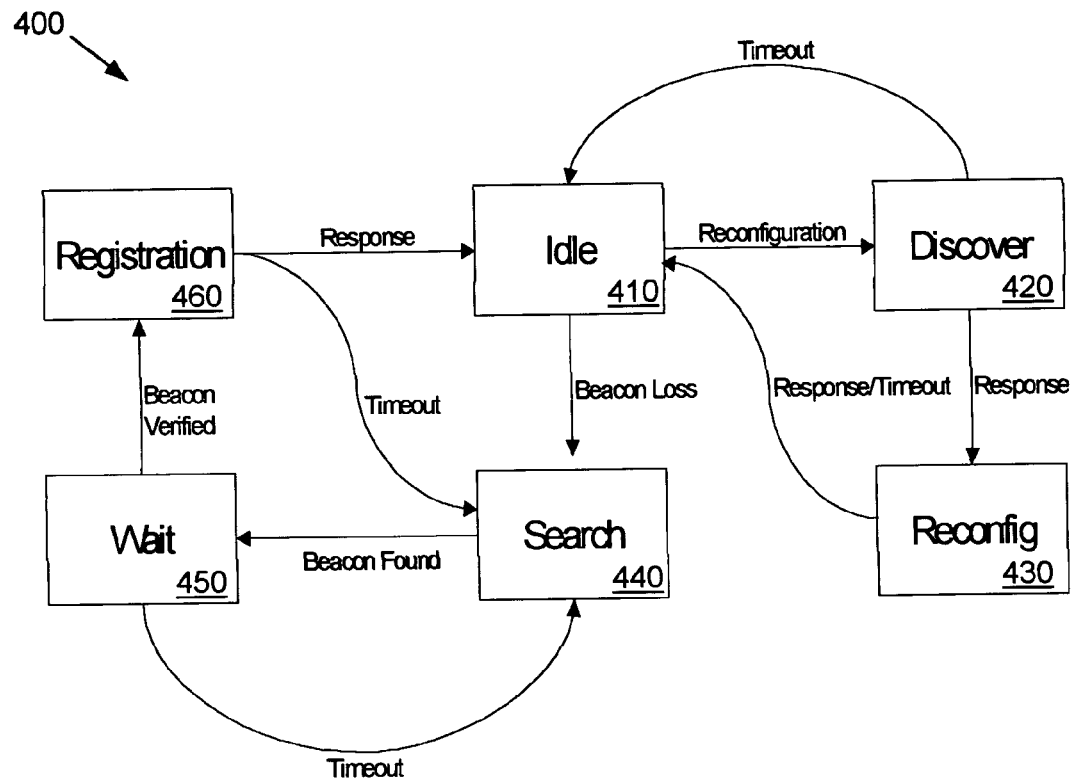
FIG. 4 is a diagram of various operating states of a network node according to certain embodiments of the present disclosure.
Figure 5:
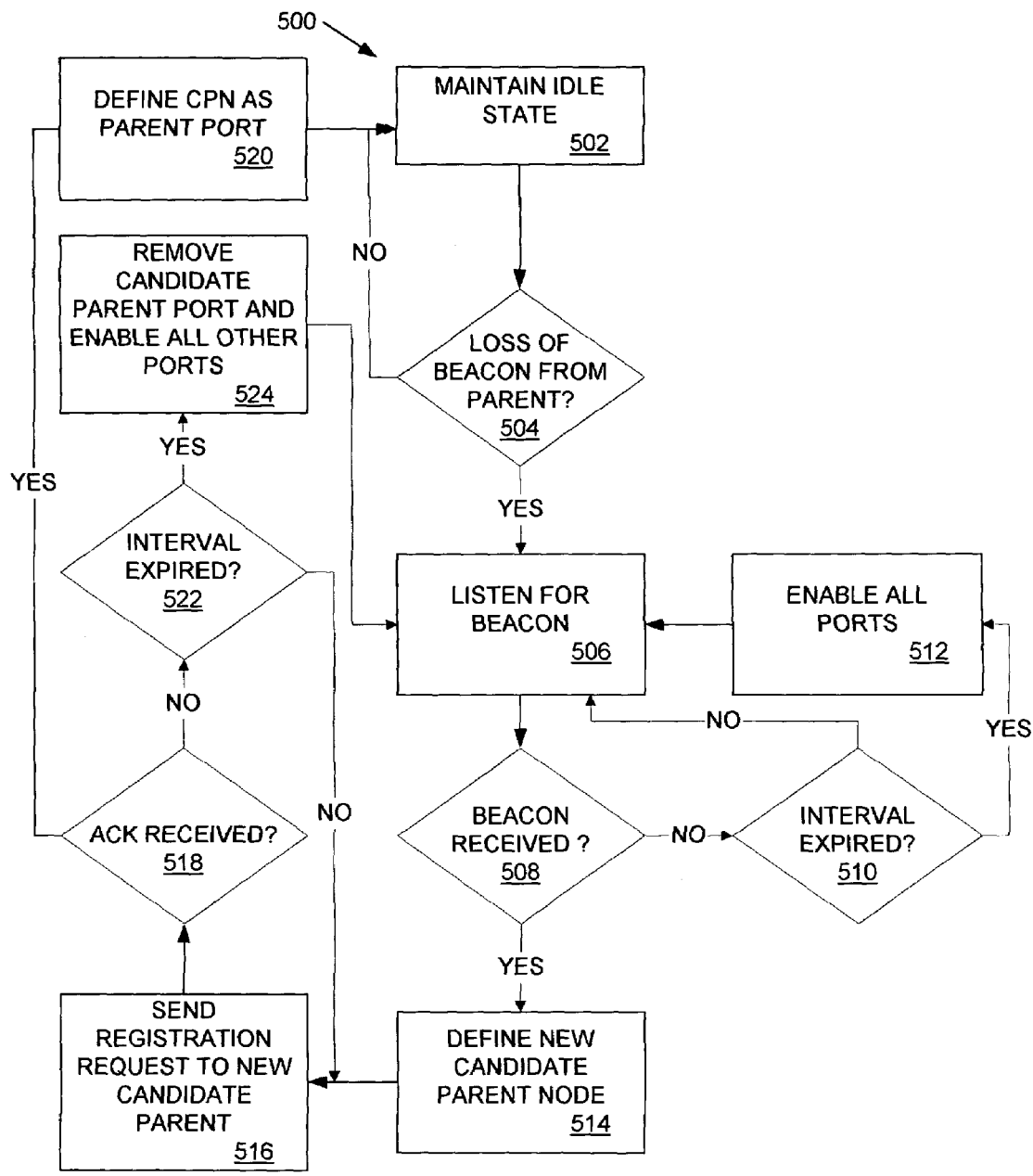
FIG. 5 is a flowchart of an exemplary network self-healing process performed by a network node according to certain embodiments of the present disclosure.
Figure 6:
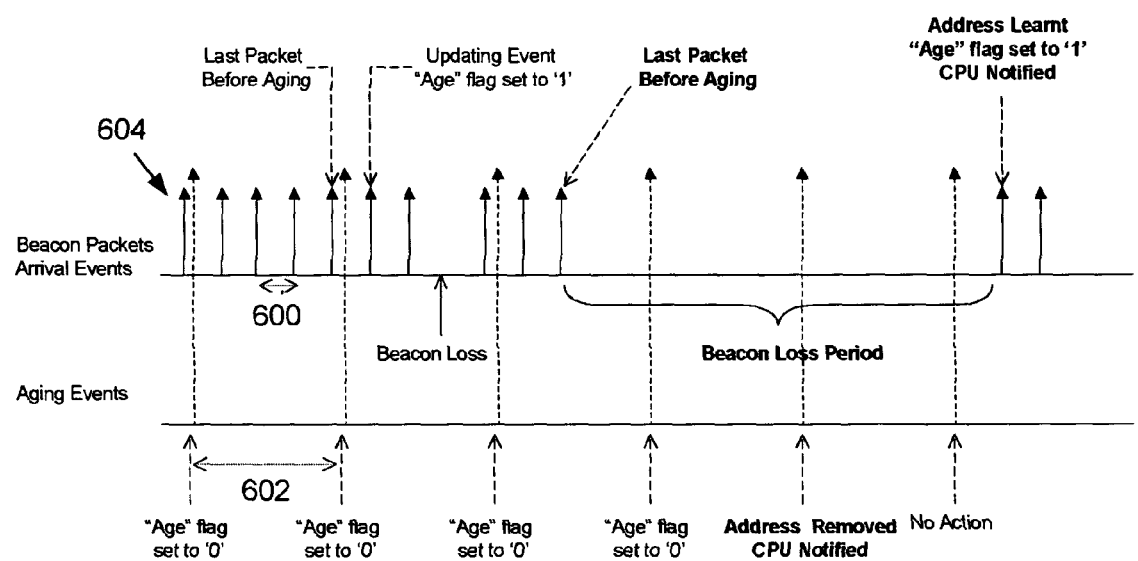
FIG. 6 is a timing diagram by which a network node determines its isolation based on aging of beacon packets according to certain embodiments of the present disclosure.

In self-healing communications networks described herein with respect to FIGS. 4–6, a number of nodes are physically deployed in a mesh configuration and may be logically connected in a tree structure. The node may provide sophisticated switch functions, such as switching decision based on the IP address or TCP port of the received packet. Such interconnected nodes can then simultaneously behave as Layer 2 (Ethernet) switches and Layer 3 (IP) switches, wherein Layer-2 switching may be provided for applications that do not need the flexibility or the additional complexities of Layer 3 switching and the Layer-3 capabilities allows for additional network flexibility. Such additional switching functionality is advantageous for provisioning advanced services, but is not required to perform the processes of the present disclosure.

The decision as to where a received packet is sent (i.e., a switching decision) is determined by each network node based on the MAC address of a received data packet. The decision on whether to perform packet switching as a Layer-2 switch or a Layer-3 switch may also be determined based on the MAC address of the data packet. This flexibility in per-packet behavior allows each node to behave as a Layer-2 switch and a Layer-3 simultaneously, though this requires additional processing by a central processing unit (CPU) of the node. This dual functionality of network nodes with respect to Layer-2 and Layer-3 switching is advantageous, however, for purposes of this discussion, Layer-2 or Ethernet switching of the network will be described, although other implementations are readily contemplated.

There are two primary ways of representing a network link: a physical link and a logical link. A physical link is a physical medium, i.e. a fiber optic cable, used to transmit and receive data signals between any two nodes and thus is identified by the characteristic of the physical transmission medium. Two nodes that are interconnected with each other by means of a link are referred to as neighbors.

A logical link is a interface between two such nodes and is characterized by fields in data packets used by the two nodes to communicate with each other which are exchanged over the physical link. The physical links described herein will be characterized as FSO (Free Space Optics) links. The two nodes may communicate using the Fast Ethernet (i.e., 100 Base FX) protocol. This allows two nodes to exchange data packets between them by formatting them as Ethernet data packets. For purposes of the description herein, a link between two nodes may be considered as a point-to-point fiber optics link that uses Layer-2 transmission protocols. Point-to-point links are used to establish a line of communication between two end points of a network segment. Such point-to-point links are commonly used to interconnect Layer-2 devices. However, it should be readily appreciated that the present disclosure may be implemented as any type of communications network, and is not specifically limited to a fiber optics environment using a particular communications protocol.

A link between any two nodes has also been referred to herein as a network segment. In particular, each node interfaces with as many as four other nodes according to the present disclosure. In addition, a node also has an additional interface, referred to as User Interface (UI), through which the user of the node (i.e. a customer or subscriber) may access the network. These UI interfaces do not necessarily participate in the disclosed process described herein.

For user devices accessing the network through the UI, the node behaves exactly like a Layer-2 switching device, but with two added functionalities. For all upstream traffic (i.e., the traffic going from the user to the network), a rate limitation feature may be imposed such that any data transmissions that exceed a predetermined bandwidth usage are dropped. This is implemented to make sure that no user can send data traffic into the network at rates higher that an allowed rate. For all the downstream traffic (i.e., the traffic going from the network to a user), edge filtering is implemented such that any packet destined for other users, other than broadcast packets, are not passed on to a particular user.

As explained above, a node in the present network acts as a Layer-2 switch. In fact, a node not only behaves as a single switch, but as multiple logical switches, allowing for operation of multiple logical networks, such as virtual LANs (VLANs), that can overlay the physical mesh network in a tree topology. A VLAN may then be considered a Layer-2 (Ethernet) logical network that spans the mesh network. Each node in the network functions as a Layer-2 (Ethernet) switch, forwarding traffic based on their Ethernet MAC destination addresses and any assigned VLAN tags. A network can thus simultaneously have multiple VLANs, each identified uniquely by its own VLAN-ID tag. All the VLANs may be topologically balanced and optimized and may overlap the same set of physical links and nodes.

It should be readily apparent from the description of the network herein that the physical network may have one or more loops. In fact, the process disclosed herein would add no value to a network that does not have such physical loops. The requirement that the network does not have any loops may apply to logical network topologies only and not necessarily to the physical connections of the network. Such a logical network can be created by disabling a node's logical interface with a segment even if the physical connection still exists. This allows for the creation of a logic tree network overlaid on top of a mesh network. Such logical connections can be based on the type of data packets transmitted or received there-through. For example, Ethernet packets can be created only for packets with certain VLAN tags. Therefore, VLAN tags also allow for creation of logical tree networks, such as VLAN Tree Networks (VTNs), overlaid on top of the physical network in order to determine the routing of such VLAN-tagged packets. The node described herein supports VLAN tagging, allowing for creation of logical network topologies as discussed herein.

In order to make a switching decision, switching hardware maintains what is referred to as a VLAN Table and a MAC Table. Each entry of the tables identifies the ports that are the members of a VLAN. Each time a packet is received by the switching hardware of a node, it first examines a standard MAC Address Table to see if it can find an entry matching the destination MAC address and/or the VLAN tag of the packet. Each entry in the MAC Table includes, among other information, a MAC Address, a VLAN and an interface ID (port number). If a corresponding entry is found for a received packet with a destination MAC and VLAN tag, that packet is transmitted via the port specified in the entry. If no matching entry is found in the MAC Address Table, the switch may refer to the entry in the VLAN Table corresponding to the VLAN tag of the received packet. If the VLAN entry is not enabled, the packet is dropped. Otherwise, the node transmits a copy of the packet through each interface that is designated as a member of the VLAN.

Even though a VTN spans all the nodes in a network, it does not necessarily make each user attached to a network node a member of the VTN. In some embodiments, each user needs to be "subscribed" to the membership of each VTN in order for it to use that VTN for customer data. This feature allows network operates to create different subnets within a mesh network by assigning different customers or set of customers to different VTNs.

As previously described, the VTN is a tree network. Such a tree structure guarantees that while all the nodes are reachable from the root of the tree, no network loops are created. A general tree structure, however, has the previously described disadvantage of a failure of a link that forms a branch of the tree causing all downstream nodes to be isolated from the rest of the network. Unless all the nodes downstream are notified, these nodes would not detect such an isolation and would continue to attempt to use the old VTN to send and receive data packets.

As described in detail herein below, a VTN algorithm is now disclosed that allows a node to automatically detect and self-recover from any kind of link or other network isolation. The algorithm described herein as been developed to autonomously create and manage a logical network that spans the maximum number of nodes in the network described above. The algorithm or the process autonomously creates one or more topologically identical logical networks which spans the maximum number of nodes in the network. It creates such networks such that no such network has a single network loop. It generates the network with a treelike topological structure such that the average distance between nodes remain close to minimal. When a set of nodes are logically isolated from the core or the network, the algorithm allows for the nodes that are isolated to detect their isolation. When such isolation takes place and detected by the affected nodes, the process allows the affected nodes to search for an alternate connection to the logical network. When such alternate connection is identified, the algorithm allows such nodes to re-establish a network connection while making sure that such process does not create a network loop. More importantly the algorithm allows for all the actions described above, namely tree-like network creation, network isolation detection and recovery from isolation, take place by automatic interaction among the nodes and without any outside or manual intervention. In addition, the algorithm outlined also allow for reconfiguration for the topological structure of the network by means of external sources like a management system while guaranteeing that no loops are created during such a process.

These functions above would be challenging, if not impossible, to implement in a large and dynamic network if each node has to keep track of the topology of the entire network. Therefore, the algorithm allows nodes to self-detect their isolation from the network and identify an active branch to which it can connect, all without having to know the topology of the entire network. It is desirable for the algorithm to be very efficient in detecting and recovering for such isolation while minimizing the CPU utilization of a node by instead using a node's switching hardware to perform such functions.

The algorithm is distributed in the sense that all the nodes use an identical algorithm, but operate it independently of each other while in an idle state, as described later below. The distributed nature of the algorithm allows the nodes in the network to establish connections among their neighbors in such a fashion that the resulting network tree spans the maximum number of nodes in the network, even though each node does not have a complete picture of the entire network. Each node only has a local picture of the network, namely its parent node (PN). By definition, a parent node is a neighboring node that is closer to the root node of the tree network. In constructing such a tree network, the only decision that a node makes that is topologically meaningful is that it identifies its parent node.

In order to assist a node in identifying its parent, the network uses a special type of Layer-2 data packet referred to as a beacon packet. Beacon packets are special packets that may have a globally identical destination address, VLAN-ID and a unique EtherType field in its header. Beacon packets are generated and transmitted periodically by root nodes of the network. Each node in the network then forwards every beacon packet to all of its physically-connected neighbors. A node considers a beacon packet to be valid only if the packet is received from its parent node. In normal operation, all other received beacon packets are dropped by the node.

The root nodes are like any other nodes with the exception of the fact that they generate special types of packets referred to as Beacon packets and at least one root node has to be functioning at any time in the network. If there are multiple root nodes, they should be logically interconnected with each other in order to facilitate the creation of the network disclosed herein. The definition of a root node in conjunction with definition of parent node for each of the other nodes in the network completely defines a logical tree structure in the network presently disclosed. It should be readily appreciated that devices other than root nodes may be used to generate beacon packets.

The algorithm is particularly suited for the types of network that have one or more nodes serving as gateways. In networks with gateways, such gateways could serve the purpose of the root nodes. However, no part of this algorithm requires that a root node also be a gateway or vice versa.

As a result, in normal operation, beacon packets propagate downstream from the root through all the branches of the tree network. Beacon packets that are periodically transmitted in this manner allow all network nodes to detect when they are isolated from the root of the network and further allow such nodes to find neighboring nodes that are not isolated. For example, in case of an isolation due to a failure of a link or a node that is part of the tree, all the nodes downstream from the failure can detect their isolation by detecting the absence of beacon packets from their parent nodes after a certain interval. When such a failure takes place, nodes that are not downstream from the failed link or node are not affected. They continue to forward beacon packets to all their connected neighbors. This allows an affected node to search for an alternate connection to the tree by enabling reception of beacon packets from all its neighbors. Reception of beacon packets from a neighbor for a certain predetermined interval guarantees that the neighbor from which the beacon packet is received is not affected by the failure. If such a neighbor is found, the affected node would designate that neighbor as its new parent node, thus establishing a logical connection with the un-isolated part of the network.

Each beacon packet is generated with the same predefined, globally identical destination address. The source MAC Address of a beacon packet may correspond to the MAC Address of the root node that is generating the beacon packet. Beacon packets generated by two or more root nodes can be distinguished from each other by the Source MAC Address of the packets. The unique destination MAC addresses may be used by each downstream node to identify a received beacon packet.

Alternately, in an Ethernet network supporting the 802.1Q protocol, beacon packets could be identified by a specific VLAN tag or an absence of a VLAN tag. In the latter case, beacon packets are transmitted by each node without VLAN tags. Therefore, when beacon packets are received by each port, they are received without a VLAN tag. As beacon packets arrive at each port, a VLAN tag is assigned to each beacon packet by the switching device of a node. When a beacon packet without a VLAN tag is received by a node, the node may also assign a VLAN tag to the packet based on the state of the port on which it is received. If the port is enabled to drop beacon packets it receives, all beacon packets received by that port are assigned a unique VLAN tag referred to as NULL VLAN. Otherwise, if the port is enabled to accept the beacon packets it receives, all beacon packets received by that port are assigned unique VLAN tag referred to as a Beacon VLAN tag Beacon VLAN tag is the tag assigned to beacon packets by a node as they are received by a port that is enabled to receive a beacon packet. The scope of Beacon VLAN tag is limited to only one node, namely the receiving node. This is because Beacon packets are passed between nodes with their VLAN tags removed. Therefore, each node in the network could assign a Beacon VLAN tag that is most suited for its need. However, when a node sends a registration message or a discovery message as described later below, it must use a VLAN tag that is common between the two nodes. The VLAN tag can therefore be the same as the Beacon VLAN tag to accommodate this requirement.

If the packet is received on a port without a VLAN tag, the switching hardware assigns a VLAN tag to the packet on the basis of port where the packet is received. Alternately, the switching hardware can assign a VLAN tag to an untagged packet based on the Ethertype field of the packet. Each port can also assign a unique VLAN tag to all untagged packets it receives.

Once the beacon packets are identified, a node could accept or discard the packet based on a state of the interface where such packet was received. Using ingress filtering, switching hardware decides on a per-packet basis whether or not to accept a packet it receives on each one of its ports. Such a decision is based on the VLAN tag of the received packet or the VLAN tag assigned to an untagged packet.

When a packet is received with a VLAN tag, the switching hardware examines the VLAN tag of the packet. If the port where the packet is received is a member of the VLAN, the packet is accepted for further processing. On the contrary, if the port is not a member of the VLAN, the packet is discarded.

A beacon packet payload can be used to include various kinds of information. For example, it can include information to facilitate authentication of beacon packets by each node. It can also include information with which a node needs to be updated every time it searches for and finds beacon packets. For example, beacon interval information, aging interval information and the like can also be included as part of the beacon packet payload. The beacon packet payload may also convey a VLAN ID to be used for registration, as well as VLAN IDs for all logical network trees created. It may also include filler bytes to meet a minimum Ethernet field size requirement. However, it is possible to implement the use of beacon packets without any payload information.

A beacon interval identifies the interval at which beacon packets are transmitted by the root node or other beacon source. The greater the frequency of beacon packet transmissions, the quicker a node may detect its isolation. Therefore, a better recovery time of a network may be achieved, since beacon outages can be determined in a shorter interval. Each root node will transmit a beacon packet at least as often as indicated by this parameter. The beacon interval, or changes in the beacon interval, can be communicated by the root node via the beacon packet payload.

In order to determine an isolation condition using such periodically transmitted beacon packets, it is not necessary to detect the presence of beacon packets so long as the loss of beacon packets can be detected. Existing address aging functions and automatic address learning feature found in existing switching hardware can be used to efficiently detect the loss of beacon packets at wire speed without sacrificing CPU processing of the node. A node detects an outage by means of periodic MAC address aging of beacon packets received from a parent node. The address aging is performed at periodic interval referred to as an aging interval, which must be greater than the beacon interval, and can be on the order of milliseconds.

An outage interval is the interval during which at least one beacon packet needs to be received by a node in order prevent it from concluding that beacon packets have been lost due to network isolation. If no beacon packet is received during an outage interval or longer, the event is referred to as beacon outage In other words, if no beacon packets are received during a defined outage interval, a node will determine that it has become isolated and it begins a search for a new source of beacon packets from its neighbors. The outage interval may be upper-bounded by two times the aging interval and lower-bounded by the aging interval, though other intervals larger than the aging interval may be used with varying efficiency. Communication of an outage interval to be used by a node, or changes thereto, can be communicated in beacon packet payloads as described previously.

The existing address learning functions performed by existing switching hardware of a node generally record source addresses of any received data packets so that the switch can determine the port that the packet needs to be transmitted on in order to properly propagate future packets downstream through the network to their destination. In order to free memory space, a node should perform address aging to remove old addresses after a time. However, such devices have limited memory capability and cannot store all such entries indefinitely, and therefore, entries need to be removed periodically to make room for new entries. Therefore, such devices implement address aging function which remove these from the table in a periodic manner.

To do this, entries in the MAC address table are flagged after a period of time by the aging function and flagged entries are then periodically removed. If a new packet is received with the same source address, the entry in the MAC address table may be replaced and the aging flag for the entry is automatically removed. If operating in 802.1Q mode, the device may also store the VLAN tag of the packet This aging process described immediately above may be modified and used to age beacon packets that are received at regular and brief intervals. The aging function for beacon packets is correspondingly brief (on the order of milliseconds) and if an age flag for the latest stored beacon packet is ever indicated, an isolation can be more quickly determined. According to the address aging and learning functions as modified in certain embodiments herein, entries in the MAC Address Table have flags referred to as aging bits. Each time a beacon packet with a specific Source MAC Address and VLAN tag is received, the switch sets the aging flag for the entry corresponding to the Source MAC Address and VLAN tag of the beacon packet. If no such entry exists, a new entry is created in the table with the aging flag set. Each time an aging function is performed, the switch resets the aging flag of each entry in the MAC Table. If, during an aging process herein, an entry is found which already had its aging bit at a reset state, the switch removes the entry and may notify the CPU of the node that is managing the switch for which the specific entry has been removed. Within an interval after such notification, the CPU may determine that a beacon outage event has occurred. It should however be understood that address aging on the Source MAC Address of beacon packets using standard functions provided by Ethernet switches is only a one way of implementing the algorithm and is not required in all embodiments In any network, it is highly desirable to minimize the time it takes a node to detect an isolation event from the time the event actually takes place. With the algorithm disclosed here, the time it takes a node to detect network isolation is directly proportional to the beacon interval, but is no less than the beacon interval. The shorter the beacon interval, the shorter the time it takes a node to detect its isolation. If the modified aging process described herein is used to detect beacon outage, the time it takes to detect an outage event is directly proportional to the aging interval but is no less that aging interval. Therefore, the outage detection time can be reduced by reducing the beacon interval and the aging interval.

Reduction of beacon interval requires generation of beacon packets by a root node at a higher frequency. Since beacon packets are very simple and small, generating them at higher frequency is not a significant challenge. In addition, since beacon packets only need to be generated by the root nodes, they can be generated by special hardware devices designed solely for the purpose of generating beacon packets. Aging on the other hand needs to be performed by each node in the network. However, as discussed earlier, the aging process is also a simple operation and can be implemented in hardware.

In actual implementation it is desirable to make the aging interval somewhat larger than the beacon interval at which beacon packets are transmitted. The primary reason for this is to make sure that there are no false isolation detections due to variance in the interval at which beacon packets are received. As individual beacon packet propagates through the network, it can be delayed at each node due to congestion in the network and such delays may accumulate as the packet goes from one node to the other. This can result in a variation of beacon packet arrival time at each node, a phenomenon commonly referred to as jitter. Even though such delays are small as compared to the beacon interval time, if the aging interval does not properly accommodate for jitter, a node may conclude that an isolation has taken place merely because a beacon packet was slightly delayed on its way to the node.

Another compelling reason to make sure that aging intervals are sufficiently long is to avoid detection of isolation when such isolations are short lived. For example, if a link gets disconnected momentarily such that only one beacon packet gets lost, it may not be meaningful to reconfigure the network. Therefore, it may be appropriate for a node to wait for multiple beacon packets to get lost before an isolation is determined. This can be achieved by making the aging interval several times larger than beacon interval. For example, if aging interval is N times the beacon interval, N consecutive beacon packets have to be lost before beacon outage can be declared. The ratio of the aging interval to the beacon interval is based on characteristics of the network in which the disclosed process is performed. In networks with fiber optics links, where probability of loss of packets is minimal, an aging interval to beacon interval ratio of 2 may be more than sufficient, whereas for wireless networks where the probability of a loss of packets is higher, a ratio or 3 or 4 may be better. Such ratio depends on the probability of loss of packets for reason other than isolation.

Another consideration in designing a self-healing network is the network capacity consumed by overhead traffic like beacon packets. The size of the overhead network capacity is dictated by the size of beacon packets and the frequency at which they are sent. Therefore, much of the overhead network capacity could be consumed by beacon packets. As was discussed above however, the beacon packets of the disclosed process carry very limited information so as to limit consumption of overhead network capacity. In fact, the size of beacon packets is dictated mostly by the minimum data packet size allowed by a network protocol. For example the minimum Ethernet packet size is 84 Bytes (including preamble and inter packet gap). If beacon packets have the size of minimum Ethernet packet and are transmitted every 50 ms, that frequency would allow a node to detect isolation within 100 ms, and would consume only about 0.01% of the total network capacity of each 100 Mbps link. Reducing the interval to 5 ms would achieve isolation detection within 10 ms while consuming only 0.1% of the network capacity.

Another attractive feature of the disclosed algorithm is the scalability of the algorithm. Just like the isolation detection time, it is desirable to reduce the time it takes for a network to recover from such isolation. As can be expected, such recovery time is directly proportional to the number of nodes in the network, i.e., the more nodes there are, the longer it takes the entire network to recover. However, with the disclosed algorithm, the recovery time is proportional to Log(N), where N is the number of nodes in the network. Therefore, the recovery time does not grow significantly as the number of nodes in the network grows.

Using all the functionality described in the foregoing, a logical tree network deployed as a physical mesh is now provided with nodes that can automatically identify a beacon outage and reconfigure its branch of the tree network in response thereto. In such a network, detection of network isolation may happen on the scale of microseconds. Convergence, or network recovery, is correspondingly more expedient, with self-recovery limited only by speed of network hardware. Optimization and balancing of the network (such that every branch has the same number of nodes) is possible and may be substantially maintained after a self-healing process, since recovery propagates around the center of the network failure.

This solution is scalable to large scale networks and provides a Log(N) recovery rate, where N is the number of nodes in a network. The solution utilizes features that may be provided in existing Ethernet switches, such as automatic address learning and aging functions to detect the loss and recovery of beacon packets, an example of which is specified in IEEE standards 802.1Q. Ingress filtering may be used for selectively dropping beacon packets. Broadcasting and multicasting features are used to forward beacon packets to all neighboring nodes. Thus, the network functions disclosed herein work may be adapted to existing Ethernet chipsets, and the CPU in each node does not have to get involved until a network failure occurs.

The network functions described herein also prevent the creation of network loops, even for a transient time, without requiring intervention by a remote management system).

Particular features of the present disclosure will now be referenced with respect to FIGS. 4–6. Turning first to FIG. 4, there is depicted a state diagram 400 of the various exemplary operating states of a node that automatically detects and recovers from upstream network failures. The node may be considered to be implemented in terms of a set of states of a Finite State Machine (FSM). Each state is characterized by a set of actions that the node performs while in that state and a set of actions the node performs when leaving the state to some other state due to the occurrence of a network event. A node in the instant VTN may operate in the six states as illustrated in FIG. 4.

The Idle State 410 is the normal operating state of a node. During this state 410, the node has one of its neighbors designated as its parent node (PN) and the corresponding port through with it communicated with PN is designated as its parent port (PP). During the Idle State 410, a node receives beacon packets from all neighbors and drops beacon packets received from any neighboring nodes that are not its parent node. Such an operation would normally require the CPU at each node to examine the source address of beacon packets and drop them if they are not received from the PN. However, by using the ingress filtering feature of the switching hardware, processing power is preserved since the switching hardware of a node may instead perform this function.

The node can enter the Idle State 410 from three other states: Registration State 460, Discovery State 420 and Reconfiguration State 430. Regardless of which state the transition is made from, the transition is made only if the node has a parent note from which it is receiving beacon packets.

While in the Idle State 410, the node may receive a Registration Request Message (RQM) that is a request from a neighbor to establish the node as its PN in response to an outage event, a Reconfiguration Request Message (RCM) that is a request from a neighbor to establish the node as its PN in response to a reconfiguration command from a network management system, or a Node Discovery Message (NDM) that is received from a neighbor for the same reason. The node may also receive a fourth type of message, a Parent Change Message (PCM), from a remove management entity that is managing the network to initiate reconfiguration of the network as described below. The circumstances under which these messages are received and the format of these messages are discussed below. A node not in the idle state 410 would not send an ACK message back to the requestor.

If a node in the Idle State 410 receives an RCM or RQM from a neighbor, it sends a response, called a Registration Acknowledgement Message (ACK), to the neighbor when the neighbor is allowed to become a child. If VLANs are being used for logical network, the node makes the neighbor a member of all the VLANs being used. Once such actions are performed, it sends an ACK back to the requesting node indicating a success of such operation. Alternately, if the neighboring node is not allowed to be a child node, no action is taken by the receiving node other than sending an ACK back to the requesting node with an error flag indicating such condition.

The format of ACK messages can depend on the network protocol. Such ACK messages can also convey other information that need to be shared by the two neighboring nodes. ACK messages are addressed specifically to the node that is being responded to. In Ethernet network, ACK messages are transmitted with the Destination MAC Address identical to the MAC address of the requesting node.

A node may also receive a Node Discovery Message (NDM) from any other node in the network. As will be evident later, a NDM message is sent by a node to another node to discover any ancestor-descendant relationship between them. In order to handle NDM message, a node in the Idle State 410 has a variable, REQUEST ID, to keep track of identification of the source of the message. If the value REQUEST ID is 0, the node updates this variable with the MAC address of the requesting node and sends a message, called Node Found Message (NFM), to the requesting node. It also starts a timer when such a response is sent. After the timer expires, the variable is set to a '0' if it is not already so. If, when NDM is received, the REQUEST ID is other than '0' or the node is not in the Idle State 410, the node does not send out a response.

A node may receive a Reconfiguration Request Message (RCM) from its neighboring node when the sender is attempting to make the node its PN following a request to do so by a central management system. Conditions under which the requesting node may not be allowed to become a child are: (1) the MAC address of the requestor does not match REQUEST ID variable; (2) whether the requesting node is PN of the node receiving the request; (3) the link interconnecting the node and the neighboring node is known to be non-functioning for transmission of packets 4) such a link has been disabled for usage by some central management system.

When in the Idle State 410, if a node receives a PCM from a network remote management system, the node makes a transition to the Discovery State 420. A transition to this state 420 does not change the overall behavior of the node. The purpose of the Discovery State 420 is for a node to verify that a prospective parent node (PPN) is not one if its descendants. Since a node, which is being asked to change its parent node, does not have a complete topological structure of the network, it has to have a way of identifying if a PPN is not its own descendant. A consequence of not doing so may lead to creation of a network loop which is isolated from the rest of the network.

If PPN is allowed to be a parent node, the PPN sends a response to the requestor indicating that the operation can proceed. If, however, the change is not allowed to be made, the PPN sends a response to the requestor indicating that the operation can not proceed. Some of the conditions under which such changes are not allowed include: (1) a REQUEST_ID field is not set to '0' (2) PPN is not a neighbor node of the requestor; and (3) the link between the node and PPN is not usable (either the link is not functioning or has been disabled). While making a transition to Discovery State, the node sets the value of its REQUEST ID variable to '0'.

During the Discovery State 420, the node continues to operate as it does in the Idle State 410 with respect to the network. During this state 420, a node does not perform any specific function when it receives the message like RCM and PCM. However, it periodically sends a Node Discovery Message (NDM) to the PPN via its interface which connects it with its Parent Node. Such an interface is referred to as Parent Port (PP). It is critical that such requests are sent through PP and PP only in order to guarantee that the NDM is received by the PPN node only if the PPN is not a descendant of the node, i.e., only if is not located somewhere downstream from the node. The NDM messages are sent by the node to the PPN via its PN until an acceptable response is received from the PPN or for a predetermined intervals that depends on the size network, latency as well as the packet loss probability of the network.

While in Discovery state 420, if the node receives, after it has sent NDM to its PPN, a Node Found Message (NFM) from the PPN, it examines the interface through which the message is received. If the NFM message was received from the interface that connects the node with its PN, the node makes a transition to Reconfiguration State 430. Checking for PN when a message is received ensures that only the messages received from nodes that are not descendants are accepted. If however, no acceptable response is received by the end of a predetermined interval, a timeout is said to happen and the node makes a transition to the Idle State 410.

The purpose of Reconfiguration State 430 is nearly the same as that of the Registration State 460, described later below with respect to FIG. 5. During this state 430, a node periodically sends a RCM to its PPN indicating its intention use it as its new PN. The RCMs are sent to PPN through the interface that connects the node directly with its PPN. However, before sending RCM to its PPN, the node also makes sure that the PPN is not already a part of the logical network the node is trying to create and, if it is, disables the interface for the logical network. For example, in case of Ethernet, the node confirms that the interface with the PPN is not a member of any VLAN other that Beacon VLAN.

While in Reconfiguration state 430, if the node receives, after it has sent RCMs to its PPN, an Acknowledgement Message (ACK) from the PPN, it examines the message and the interface through which the message is received. If the message indicates a success and was received from the interface that connects the node with its PPN, the node performs the following actions: (1) removes PN from the membership of all logical networks; (2) enables discarding of beacon packets received from PN (3) enables reception of beacon packets from PPN; (4) makes PPN a member of all logical networks; (5) designates PPN as its PN; (6) sends a message to its remote management system, if any, indicating that the node has changed its parent node; and (7) makes a transition to Idle state 410. If no ACK is received for a predetermined time out period, the node makes a transition to the Idle State 410 without making any other changes.

If the PPN is allowed to accept the requesting node as its child, it does so by making the port that connects it with the node as a member of all VLANs in its VLAN table, and sends an ACK message to the requesting node. If the PPN is not allowed to accept a node as a child, it takes no action and does not send any ACK.

Although the node in Reconfiguration State 430 behaves much like a node in the Idle State 410, during this state 430, a node does not perform any specific function when it receives the message like RCM and PCM. This is because, during this process, it is critical that no topological changes in the network are performed when a change of parent process is underway. Sending a response to RQM in the same fashion as the nodes does while in the Idle State 410 is possible, but only after making sure that no transient conditions can occur.

While in the Reconfiguration State 430, the node waits for a timeout period, followed by a periodic transmission of a Reconfiguration Message (RCM) to its PPN via the preferred parent port (PPP) that connects it with the PPN. If PPN is in Idle State 410 and its REQUEST ID matches the MAC address of the node sending the RCM, it makes the requesting node its child and sends the ACK back to the requesting node. Once the requesting node receives the response from the PPN, it removes the parent status of the old PN and adds the PPN as its new PN. Forwarding of beacon packets received from the new PN to all the neighbors is enabled and a transition is made back to the Idle State 410.

Upon detection of a loss of beacon packets from a PN, the node transitions from any of states 410–430 to a Search State 440, where the node searches for a new source of beacons from all of its neighbors. While in the Search State 440, the node does not make any changes to the state of any one of its link with respect to their membership of a particular logical network. Specifically, for the case of Ethernet network, the VLAN memberships of the ports are not changed. This guarantees that, in the event that the network recovers from isolation while the node is in this state 440, the network traffic continues to flow through the network.

While making this transition, a node will performs the following operations: (1) set the value of REQUEST ID to '0' (2) enable reception of beacon packets from all its neighboring nodes; and (3) stop forwarding for beacon packet to any one of the node's neighbors.

Reception of beacon packets for certain duration form a neighbor guarantees that the neighbor is not affected by the failure. When such a new source is found, the node enters a Wait State 450, and if the new source is not a descendant node, the node requests the new source to be its parent during a Registration State 460. The operability of a node within states 440–460 are more particularly described immediately below with reference to FIG. 5.

A self-healing process 500 may be performed whenever a node is in the Idle State 410 (step 502) and detects an isolation from its root (step 504). The process 500 may also be performed from states 420 and 430. Once a beacon loss is detected, the node may initially wait for a brief interval (step 510) to determine whether beacon packet reception from a PN is restored, after which a transition is made from its current state to the Search State 440. When a transition is made to this state 440, the node enables reception of beacon packets from all of its connected neighbors on all ports (step 512) and continues to iterative steps 506 and 508 to determine if beacon packets are received from other neighboring nodes. Subsequent entries into step 512 may include the enabling of all ports except ports previously attempted. A final entry in step 512, after all neighboring nodes have been examined, may once again enable all ports until a transmission of a beacon packet from any neighbor is detected.

When a neighboring node is not isolated from the network, it continues to forward beacon packets to all its neighbors, including the isolated nodes. Therefore, if a node receives a beacon packet from one of its neighbors, it is an indication that the neighbor is not isolated from the root.

If a link connecting the node in Search State 440 with its neighbor is not connected, or is connected but is in a Down state, beacon packets received from that neighbor are discarded. This is done in order to make sure that a link that is disconnected or down does not become a PN of the new VTN tree.

During this state 440, forwarding of beacon packets to all neighboring nodes is also disabled. This is done in order to make sure that a node is not fooled into selecting its descendant as its new parent by reception of a beacon packet that was originally transmitted by it downstream. If one of the neighbors is a descendant of the node in the Search State 440, the node would receive the same beacon packet it forwarded to its child neighbor. By disabling the forwarding of beacon packets, this potential for creating a network loop is avoided. Suspension of the forwarding of beacon packets also serves to ensure that other downstream nodes detect the beacon outage.

During the Search State 440, no change is made to the VLAN membership information stored by a node. This guarantees that, in the event that the network recovers from isolation while the node is in this state, the network traffic continues to flow through the network The node also does not perform any specific function in response the message like RQM, RCM, and PCM.

While in the Search State 440, the primary goal is to find any neighboring node that is not isolated from the root node. However, if there are multiple such neighbors, it may be desirable to connect with one such neighbor over another. For example, a link connecting the node and one of its neighbors may have had better history of reliability than a link connecting the node with another one of its neighbors. In this case, it is preferable to connect the first neighbor as a parent node instead of the second one. However, if the first neighbor is also isolated, it is more desirable to use the second neighbor as a parent node if no other alternatives are available. In order to achieve this objective, the algorithm can allow for priority assignments to interfaces of each node such that when searching of a new parent, a node can choose the neighbor with higher priority if such a neighbor is available.

In Search State 440, the node uses a timer to periodically check beacon packets it may have received from its neighboring nodes. The timer is first started by the node when it enters the Search State 440, enables reception of beacon packets from all its neighbors and keeps a history of the interfaces from which the packet was received each time such a packet was received. When the timer reaches a timeout event, the node exams the history of the ports from which the packets were received. Among the ports that received packets during the interval, the node selects the port with the highest priority value with the exception of the ports in their Invalid Flags set as it Candidate Parent Port (CPP) and makes a transition to a Wait State 450. If no beacon packets are received during this interval, the node reset the Invalid Flag of all the interfaces and restarts the timer. The value of this interval depends on the beacon interval, jitter in the beacon interval and the reliability of network links. This interval also dictates the time it takes for a node to recover from an isolation.

If a beacon packet is received from a neighbor at step 508 above, the node next enters the Wait State 450. The Wait State 450 serves three purposes. It provides sufficient time for any transient conditions in the network to settle down. It allows a node to verify that the beacon packet continues to be received from its neighbor node, now designated a Candidate Parent Node (CPN) (step 514). It also allows for authentication of the beacon packets received from the CPN, and the node may extract any parameters provided in the beacon packet payload. Unlike in Search State 440, when in this state 450, the node accepts beacon packets only from its CPN. Beacon packets received on any other ports are discarded. The beacon packets received from the CPN are not forwarded to any one of the neighboring nodes.

A node remains in the Wait State 450 only for a predetermined brief interval. During this interval, it discards any beacon packets received from nodes other than its Candidate Parent Node (CPN). If no packets are received from CPN either, it sets the Invalid Flag of the candidate parent port (CPP) corresponding to CPN and makes a transition to Search State 440 above. While making the transition, the node enables reception of beacon packets from all its neighbors. On the other hand, if at least one beacon packet is received from the CPN during the interval, the node authenticates the beacon packet and makes a transition to Registration State 460.

Only one neighbor at a time can be identified as a CPN. The port that connects the isolated node to the CPN is referred to as the Candidate Parent Port (CPP). Once a valid beacon packet is received on CPP, a transition is made to Registration State 460.

The purpose of the Registration State 460 is to notify a CPN about a node's intention of using it as a PN. During this state 460, a node periodically sends Registration Request Messages (RQM) to its CPN (step 516) through its CPP. However, before sending RQM to its CPN, the node also makes sure that the interface is not already a part of the logical network the node is trying to create and, if it is, disable the interface for the logical interface. For example, in case of Ethernet, the node ensures that the port is not a member of any VLAN other that Beacon VLAN. The RQM messages are sent by the node to the CPN until an acceptable response is received from the PPN or a predetermined interval expires. That predetermined interval depends on the packet loss probability of the link connecting the nodes and its CPN.

A registration request packet is a Layer-2 data packet that is sent from the isolated node to the CPN in step 516 above. The source MAC address field of a registration request packet is the same as the MAC address of the node sending the registration request. This field then helps the CPN identify the MAC address of the requesting node and provides the address to which an acknowledgement may be sent.

When a node sends out a registration request packet to its neighboring node, it may not know the MAC address of the neighboring node. This is because no aspect of the algorithm requires that a node attaching itself to a branch of a tree know anything about its neighboring nodes. The destination MAC address of a registration packet then depends on the type of the packet and the circumstances under which the packet is generated. If the CPN is identified as a known node, which means its Node ID is known, it is assumed that its MAC address is also known. In that case, a Registration Request packet is sent out with its MAC address the same as the MAC address stored for the CPN.

If the parent node identified as an unknown node, which means its Node ID and its MAC address is not known, a Registration Request packet is sent with a globally identical MAC address, referred to as a Registration MAC address. In this mode, the requesting node forwards the registration Request packet with the Registration MAC address to the port that is connected to the CPN. The CPN also makes sure that it does not continue to forward beacon packets to the nodes downstream so that no false registrations take place. Just like with beacon packets, every node is knowledgeable of such globally identical MAC Address.

While in Registration state 460, if the node receives, after it has sent RQMs to its CPN, an Acknowledgement Message (ACK) from the CPN (step 518), it examines the message and the interface through which the message is received. If the message indicates a success and was received from the interface that connects the node with its CPN, the node performs the following actions: (1) removes PN from the membership of all logical networks; (2) enables discarding of beacon packets received from PN; (3) enables reception of beacon packets from CPN; (4) makes CPN member of all logical networks; (5) designates CPN as PN (step 520); (6) sends a message to a remote management system, if any, indicating that the node has changed its parent; and (7) makes a transition to the Idle State 410

When an ACK indicating a success is received (step 518), the node may examine the payload of ACK to retrieve any network information sent by the CPN. If however, an ACK is received with an error indication, the node puts the CPP in the state is was in before the RQM message was sent. For example, if the node has removed the CPP from the membership of certain VLANs before sending the RQM as stated above, the node makes the CPP member of those VLANs. It also sets the Invalid Flag corresponding to the CPP and makes a transition to the Search State 440. If no ACK response is received after a predetermined interval, a timeout is said to happen. In this case also, the node sets the Invalid Flag corresponding to CPP and makes a transition to the Search State 440. In this case, the node does not restore the state of the CPP. While making the transition, it also makes sure that all the other ports of the node are enabled (step 524) to receive beacon packets and all the ports are disabled to forward beacon packets, after which the process 500 returns to step 506 above.

A key aspect of the Registration State 460 is to remove the CPP from VLAN membership prior to acknowledgement from the CPP. This is because CPN, at some time in the past, may have been a child node. If the CPP remains a member of VLAN and CPP also adds all VLANs after it receives the registration request, a transient loop may created in the network. This is because, before the requesting node receives an acknowledgement from the CPP, it would continue to use the old parent as its Parent Node. Until this Parent Port is removed from the stored membership of VLANs, a loop is created in the network.

When the CPN (or PPN) changes its parent, it would not have notified its PN node about the change and, therefore, the PN would have never had a chance to remove the link from logical network. At some point later in time, when the node sends the RQM (or RCM) message to the CPN (or PPN) neighbor, the neighbor may accept the request and add the corresponding interface to the logical network. This would create a loop in the logical network until the requesting node receives the ACK message and removes its interface with its old parent node from the logical network. However, most often, existence of the loop even for a very short duration may mean a serious trouble for the network. Therefore, the removal of the interface from the logical network before a RCM or RQM is sent out is essential Turning now to FIG. 6, there is depicted an exemplary timing diagram displaying the process by which a node may detect a network isolation using the aging of beacon packets. The aging process can be implemented in various forms. It can be implemented in software where a CPU sets a flag every time a node receives a packet matching the description of a beacon packet from its parent port. The flag may be reset periodically.

The aging process can also be implemented in hardware where a flag, represented as a register, is updated every time a packet matching the Source Address (Source MAC Address) of beacon packets is received. The flag may be reset periodically by a recurring process, e.g., a counter clocked by a periodic signal.

The aging process can ether be triggered by the CPU or done by the switching hardware at a pre-defined interval 602, as shown in FIG. 6. When triggered by the CPU, the CPU has to instruct the switching hardware to initiate the aging process. However, the aging process itself may instead be performed by the switching hardware alone. Regardless of which aging method is used, the switching hardware provides mechanism to notify the CPU when a new address is learned or an old address is removed.

All beacon packets 604 are transmitted by root nodes with the same predefined source MAC address for validation at a beacon interval 600 of b milliseconds. Each node performs periodic aging of the Beacon Source MAC address at every aging interval 602 of a milliseconds. If a>b, then during normal operating condition, we expect to receive at least one beacon packet between every two consecutive aging events. As long as at least one beacon packet is received between two consecutive aging intervals, the Beacon Source address is not aged out by the aging process.

If there are no valid beacon packets received between two consecutive aging events, the beacon source MAC address is removed during the second of the two events and the CPU is notified of the aging events. Such notification can be used as an indication of the loss of beacon packets and network failure, and the process 500 described above is initiated.

The remaining discussions herein are directed to the resolution of errors that may arise during transient conditions of network reconfiguration in response to an outage event or a PCM. It has been demonstrated that even in small networks, loops can be created when error conditions are not handled properly. One such case is when registration response packets from a CPN to a requesting node in the Registration State 460 are lost in the network. This may create a transient state during which a CPN may need to change its PN. if the CPN selects a descendant of the requesting node, a loop could temporarily exist in the network. One way to prevent this kind of transient state would be to require that the node sending the registration request to its CPN first remove the CPP from membership of the VLAN.

Removing the CPP as a member of the VLANs before sending the registration request packets would disrupt VTN traffic to the nodes downstream. Such disruptions, though, have little impact if the parent port change is brought about by self-healing mechanism. Such a disruption however could be a problem if the parent port change event is due to a reconfiguration request from the remote management system.

In event of a reconfiguration message when a node is asked to connect with its own child node, if the node removes the port that connects it with its PPN, the PPN and all the nodes downstream from it would lose their network connectivity until the process is complete. A registration request with a node's own child is never going to be fulfilled, since the child knows the parent status of the requesting node and will not allow for the change. This is because a node recognizes its PN and can not allow it parent to register with as a child. However, a serious problem is created when a node is asked by a reconfiguration message to use one of its later descendants as its parent node.

Such problems could be solved if a node has a way of verifying that a PPN is not one of its descendants. As a first manner for accomplishing this, a node may send a message to its PPN via its PN and wait for a response. The message is thus only sent upstream such that if the node's PPN is downstream, it would not receive the message.

The second manner, which is not entirely reliable, is to use an address query mechanism. In this case, a node would try to find out if its PPN is its descendant by searching for the MAC address of the prospective parent in its MAC table. This mechanism could be made more reliable by first sending a message to the PPN and after receiving a response, searching for its MAC address in the address table. The prospective parent is guaranteed not to be a descendant of the node if and only if the MAC address resides in the port that is also the PP of the node.

A combination of both these solutions may be used such that the message is sent to a PPN via an upstream node and when a response is received, the node performs an address query to verify that the address resides in the PP. This would guarantee that the PPN is not a descendant node.

Besides verifying ancestor-descendant relationship, it would be advantageous to guarantee that the relationship is maintained until the node actually completes changing the PPN to its PN. After the time a node receives a response to the message about ancestor-descendant relationship, the network topology may have changed. If such topology change occurs, the ancestor-descendant relationship just verified may no longer be valid. One way to solve this problem is to implement a messaging mechanism by which a node notifies all its descendants if it has changed its parent. This can be done by sending a beacon-like packet downstream from the node to all its children, which in turn would then relay the bacon-like packet further downstream.

An even more desirable way to solve this problem is to make sure that no more than one reconfiguration process per mesh is initiated. By ensuring that no more than one reconfiguration process takes place in a network, we can guarantee that topological relationship between two node and PPN would not change without either node knowing about it.

Once a node receives a reconfiguration message from the remote management system, it sends a message to its PPN through its upstream parent node. Such a message it called Discovery Message. Since the isolated node knows the MAC address of the PPN, the message is sent to that MAC address, but using the Beacon VLAN tag. When the node sends out Discovery Message, it also raises a DISCOVERY_TX flag to indicate that the node is in the process of discovering the relationship between itself and the PPN.

When the PPN receives a Discovery Message from the node and it is in the Idle State 410, it sends out a response to the node. If it is not in the Idle State 410, it does not send a reply back to the node. When the PPN sends a reply back to the node, it sets REQUEST ID to the MAC address of the node.

When the node receives the reply from PPN, it checks to see if its DISCOVERY_TX flag has been set. If the flag has been set, this indicates that the PPN hasn't been affected by any topological changes since the node last sent out the Discovery Message. In this case, the isolated node sends out a Registration Request to node PPN thought the link which connects the isolated node with the PPN.

When node PPN receives a registration request from the node, it checks the status of its REQUEST ID. If the REQUEST ID has not been set to 0, this confirms that the PPN has not been affected by any topological changes since it received Discovery Message (assuming that only one node sent such a message). In the event that the flag is set, the PPN accepts the registration request, and sends a response to the node.

If either the node or its PPN detects a change in topology, they would reset their corresponding DISCOVERY_TX flag and REQUEST ID respectively, thereby indicating the topological change since the last Discovery process.

It has further been demonstrated that a transient condition can exist in the network if, while a node is trying to change is parent to another node, some other node also tries to change its parent due to a failure condition. The simplest way to avoid this loop by adding a fixed time between the time when the node receives a NFM message from its CPN until the time it sends a registration request to its CPN that is sufficient to detect subsequent network changes while minimizing impact on network recovery time.

Although the best methodologies of the invention have been particularly described in the foregoing disclosure, it is to be understood that such descriptions have been provided for purposes of illustration only, and that other variations both in form and in detail can be made thereupon by those skilled in the art without departing from the spirit and scope of the present invention, which is defined first and foremost by the appended claims.

What is claimed is:

1. A method for automatically detecting and self-recovering from a network isolation condition in a network comprising a plurality of network nodes and a group of one or more root nodes, the method comprising:

configuring the group of root nodes to periodically generate beacon packets;

configuring each of the plurality of network nodes to have finite states consisting of an idle state, a discovery state, a reconfiguration state, a search state, a wait state, and a registration state;

receiving, during said idle state, at said each of the plurality of network nodes a first beacon packet originating from the group of root nodes through an adjacent node of said each of the plurality of network nodes, wherein said adjacent node of said each of the plurality of network nodes is designated as a parent node of said each of the plurality of network nodes;

storing at said each of the plurality of network nodes an aging indicator for the first beacon packet after a first aging interval;

resetting said aging indicator at said each of the plurality of network nodes when a second beacon packet is received through said adjacent node of said each of the plurality of network nodes and source address of said second beacon packet matches source address of said first beacon packet;

if said aging indicator is not reset by said second beacon packet received through said adjacent node of said each of the plurality of network nodes after a second aging interval greater than the first aging interval, then:

indicating said network isolation condition during said idle state;

listening, by said each of the plurality of network nodes during said search state, for a new beacon packet originating from the group of root nodes, and said new beacon packet is received through a different adjacent node of said each of the plurality of network nodes;

entering, by said each of the plurality of network nodes, said wait state in response to receiving said new beacon packet;

verifying, during said discovery state, said different adjacent node of said each of the plurality of network nodes is not a descendant node of said each of the plurality of network nodes;

in response to said verifying, transmitting, during said registration state, a registration request to said different adjacent node to establish said different adjacent node as a new parent node of said each of the plurality of network nodes when said different adjacent node of said each of the plurality of network nodes is not the descendant node of said each of the plurality of network nodes;

receiving an approval, in reconfiguration state, from said different adjacent node of said each of the plurality of network nodes in response to said registration request;

deleting a parent status of said adjacent node of said each of the plurality of network nodes; and storing an indication of said different adjacent node as said new parent node at said each of the plurality of network nodes.

2. The method of claim 1, wherein each of the beacon packets comprises a universal destination address for validating the beacon packets.

3. The method of claim 1, said receiving further comprising:

receiving the new beacon packet from another adjacent node of the each of the plurality of network nodes other than the parent node; and dropping the new beacon packet received from said another adjacent node of the each of the plurality of network nodes when the network isolation condition is not indicated.

4. The method of claim 1, said transmitting further comprising:

transmitting a discovery message upstream; and receiving a reply to the discovery message from said another adjacent node of the each of the plurality of network nodes on an upstream port.

5. The method of claim 1, wherein the second aging interval is at least twice the first aging interval.

6. The method of claim 1, further comprising:

continuously receiving a plurality of beacon packets that are individually transmitted by at least one of the root nodes at an interval that is shorter than the first aging interval.

7. The method of claim 1, further comprising:

transmitting the first beacon packet received from the parent node to all neighboring network nodes.

8. The method of claim 1, further comprising:

receiving a network reconfiguration command; and selecting the new parent node that is not the descendant node within the network in response to the network reconfiguration command.

9. The method of claim 8, further comprising:

operating in a discovery state after receiving the network reconfiguration command until an ancestor-descendant relationship is identified.

10. The method of claim 1, said storing performed by a network switching element of a node without any processing by a central processing unit (CPU) of the node.

11. The method of claim 1, wherein the network comprises an Ethernet protocol network.

12. The method of claim 1, wherein the age indicator is stored in an age field of a packet address table.

13. The method of claim 1, further comprising:

storing the age indicator for a plurality of stored data packets other than the first beacon packet at the first aging interval.

14. A computer readable storage medium encoded with processing instructions for implementing a method for automatically detecting and self-recovering from a network isolation condition in a network comprising a plurality of network nodes and a group of one or more root nodes, the method comprising:

configuring the group of root nodes to periodically generate beacon packets;

configuring each of the plurality of network nodes to have finite states consisting of an idle state, a discovery state, a reconfiguration state, a search state, a wait state, and a registration state;

receiving, during said idle state, at said each of the plurality of network nodes a first beacon packet originating from the group of root nodes through an adjacent node of said each of the plurality of network nodes, wherein said adjacent node of said each of the plurality of network nodes is designated as a parent node of said each of the plurality of network nodes;

storing at said each of the plurality of network nodes an aging indicator for the first beacon packet after a first aging interval;

resetting said aging indicator at said each of the plurality of network nodes when a second beacon packet is received through said adjacent node of said each of the plurality of network nodes and source address of said second beacon packet matches source address of said first beacon packet;

if aging indicator is not reset by said second beacon packet received through said adjacent node of said each of the plurality of network nodes after a second aging interval greater than the first aging interval, then:

indicating said network isolation condition during said idle state;

listening, by said each of the plurality of network nodes during said search state, for a new beacon packet originating from the group of root nodes, and said new beacon packet is received through a different adjacent node of said each of the plurality of network nodes;

entering, by said each of the plurality of network nodes, said wait state in response to receiving said new beacon packet;

verifying, during said discovery state, said different adjacent node of said each of the plurality of network nodes is not a descendant node of said each of the plurality of network nodes;

in response to said verifying, transmitting, during said registration state, a registration request to said different adjacent node to establish said different adjacent node as a new parent node of said each of the plurality of network nodes when said different adjacent node of said each of the plurality of network nodes is not the descendant node of said each of the plurality of network nodes;

receiving an approval, in reconfiguration state, from said different adjacent node of said each of the plurality of network nodes in response to said registration request;

deleting a parent status of said adjacent node of said each of the plurality of network nodes; and storing an indication of said different adjacent node as said new parent node at said each of the plurality of network nodes.

15. An apparatus for automatically detecting and self-recovering from a network isolation condition in a network comprising a plurality of network nodes and a group of one or more root nodes, the apparatus comprising:

means for configuring the group of root nodes to periodically generate beacon packets;

means for configuring each of the plurality of network nodes to have finite states consisting of an idle state, a discovery state, a reconfiguration state, a search state, a wait state, and a registration state;

means for receiving, during said idle state, at said each of the plurality of network nodes a first beacon packet originating from the group of root nodes through an adjacent node of said each of the plurality of network nodes, wherein said adjacent node of said each of the plurality of network nodes is designated as a parent node of said each of the plurality of network nodes;

means for storing at said each of the plurality of network nodes an aging indicator for the first beacon packet after a first aging interval;

means for resetting said aging indicator at said each of the plurality of network nodes when a second beacon packet is received through said adjacent node of said each of the plurality of network nodes and source address of said second beacon packet matches source address of said first beacon packet;

means for, if said aging indicator is not reset by said second beacon packet received through said adjacent node of said each of the plurality of network nodes after a second aging interval greater than the first aging interval, then:

indicating said network isolation condition during said idle state;

listening, by said each of the plurality of network nodes during said search state, for a new beacon packet originating from the group of root nodes, and said new beacon packet is received through a different adjacent node of said each of the plurality of network nodes;

entering, by said each of the plurality of network nodes, said wait state in response to receiving said new beacon packet;

verifying, during said discovery state, said different adjacent node of said each of the plurality of network nodes is not a descendant node of said each of the plurality of network nodes;

in response to said verifying, transmitting, during said registration state, a registration request to said different adjacent node to establish said different adjacent node as a new parent node of said each of the plurality of network nodes when said different adjacent node of said each of the plurality of network nodes is not the descendant node of said each of the plurality of network nodes;

receiving an approval, in reconfiguration state, from said different adjacent node of said each of the plurality of network nodes in response to said registration request;

deleting a parent status of said adjacent node of said each of the plurality of network nodes; and storing an indication of said different adjacent node as said new parent node at said each of the plurality of network nodes.

* * * * *

UNITED STATES PATENT AND TRADEMARK OFFICE
CERTIFICATE OF CORRECTION

PATENT NO. : 7,233,991 B2 Page 1 of 1
APPLICATION NO. : 10/647070
DATED : June 19, 2007
INVENTOR(S) : Prasanna Adhikari It is certified that error appears in the above-identified patent and that said Letters Patent is hereby corrected as shown below:

Column 23, line 4, Claim 14
  Before "aging indicator", insert --said--

Column 23, line 12, Claim 14
  Delete "nodes,", insert --nodes;--

Signed and Sealed this

First Day of April, 2008

JON W. DUDAS
*Director of the United States Patent and Trademark Office*